US005149947A

United States Patent [19]

Collins, Jr.

[11] Patent Number: 5,149,947

[45] Date of Patent: Sep. 22, 1992

[54] PORTABLE CHECKOUT SYSTEM

[75] Inventor: Donald A. Collins, Jr., Cambridge, Ohio

[73] Assignee: NCR Corporation, Dayton, Ohio

[21] Appl. No.: 328,659

[22] Filed: Mar. 27, 1989

[51] Int. Cl.[5] ........................ G06K 7/10; A63F 9/02

[52] U.S. Cl. ........................ 235/462; 186/59; 186/62; 235/383

[58] Field of Search ............... 235/383, 462, 472, 375; 186/59, 61-64, 60; 248/214, 235, 222.2, 227, 205.1, 230, 218.4, 690, 692; 108/44, 46, 152; 211/113; 280/33.992, 33.993, 33.995

[56] References Cited

U.S. PATENT DOCUMENTS

| | | | |
|---|---|---|---|
| 2,888,761 | 6/1959 | Miller | 186/62 |
| 3,251,543 | 5/1966 | Bush et al. | 280/33.992 |
| 3,265,297 | 8/1966 | Behrens | 280/33.992 |
| 3,332.653 | 7/1967 | Hoelzel | 248/210 |
| 3,438,644 | 4/1969 | McMillan et al. | 280/33.992 |
| 3,480,114 | 11/1969 | Shoffner | 186/60 |
| 3,809,351 | 5/1974 | Bravo et al. | 248/210 |
| 3,836,755 | 9/1974 | Ehrat | 235/383 |
| 4,071,740 | 1/1978 | Gogulski | 235/431 |
| 4,174,866 | 11/1979 | Rhyan | 248/210 |
| 4,251,798 | 2/1981 | Swartz et al. | 235/462 |
| 4,369,361 | 1/1983 | Swartz et al. | 235/470 |
| 4,373,133 | 2/1983 | Clyne et al. | 235/383 |
| 4,471,218 | 9/1984 | Culp | 235/472 |
| 4,535,962 | 8/1985 | Chan et al. | 248/214 |
| 4,570,057 | 2/1986 | Chadima, Jr. et al. | 235/472 |
| 4,621,189 | 11/1986 | Kumar et al. | 235/472 |
| 4,643,280 | 2/1987 | Hensley | 108/44 |
| 4,787,467 | 11/1988 | Johnson | 235/383 |
| 4,838,383 | 6/1989 | Saito et al. | 235/383 |
| 4,901,901 | 2/1990 | Reitenour | 280/33.992 |

*Primary Examiner*—John W. Shepperd
*Assistant Examiner*—Christopher R. Glembocki
*Attorney, Agent, or Firm*—Richard W. Lavin

[57] ABSTRACT

A checkout system includes an optical scanning device removably mounted on the handles of oppositely positioned grocery carts to enable a operator to remove a purchased merchandise item from one of the carts and to move the item past the scanning device for deposit in the second grocery cart. An electrical cable connects the scanning device to an electrical outlet in the floor adjacent the carts. A second embodiment provides a support member removably mounted to the handle of a grocery cart containing purchased merchandise items and extending outwardly from the cart to support the scanning device adjacent the handle allowing a checkout operator to check out the purchased merchandise items located in the grocery cart utilizing the scanning device.

3 Claims, 4 Drawing Sheets

PORTABLE CHECKOUT SYSTEM

BACKGROUND OF THE INVENTION

The present invention relates to checkout systems and more particularly to a checkout system which can be set-up and operated at any location within the commercial establishment.

In a merchandise checkout operation, a checkout operator will move the purchased merchandise items past an optical scanner mounted within a checkout counter, the scanner scanning a coded label on the merchandise item and outputting electrical signals identifying the item. Using the data represented by the electrical signals, a data processing system coupled to the scanner will retrieve the price of the purchased merchandise item from a remote look-up table and display the price to the customer and the operator. The operator then enters the price of the item into a data terminal device which prints the necessary data on a receipt which is then given to the customer after the customer has paid for the purchased merchandise item. The receipt includes the price of each merchandise item purchased and the total cost of the items. This type of checkout operation can be very time consuming due to the length of the waiting periods in the checkout lines.

SUMMARY OF THE INVENTION

A merchandise checkout system includes a portable scanning terminal which comprises a housing in which is located an optical scanning device and a scanning window, a dot-matrix display, a keyboard, a printer and a magnetic stripe reader. In one embodiment, the scanning terminal is removably mounted between the handles of two oppositely positioned grocery carts, allowing a checkout operation to occur at any location in the store. The second cart is used to hold the grocery bags in which are placed the purchased merchandise items after they have been checked out utilizing the optical scanning device. In a second embodiment, the scanning terminal is positioned on a support member secured to the handle of a grocery cart enabling a checkout operation to occur anywhere in the store utilizing one grocery cart with the purchased merchandise items being placed in a grocery bag located on any adjacent supporting surface. The checkout operator will move the purchased items past the scanning window on the scanning terminal, enabling the optical scanning device to read the bar code label located on the purchased item. The customer may use the keyboard to enter a personal identification number and may use the magnetic stripe reader to read a credit card in payment for the purchased merchandise items.

It is therefore a principal object of this invention to provide a checkout system which increases the speed of the checkout operation.

It is another object of this invention to provide a checkout system which can be performed in any location within the store.

BRIEF DESCRIPTION OF THE DRAWINGS

These and other objects, features and advantages of the invention, as well as the invention itself, will become more apparent to those skilled in the art in view of the following detailed description taken in consideration with the accompanying drawings wherein like reference numerals indicate like or corresponding parts throughout the several views and wherein.

DESCRIPTION OF THE PREFERRED EMBODIMENT

Figure 1:
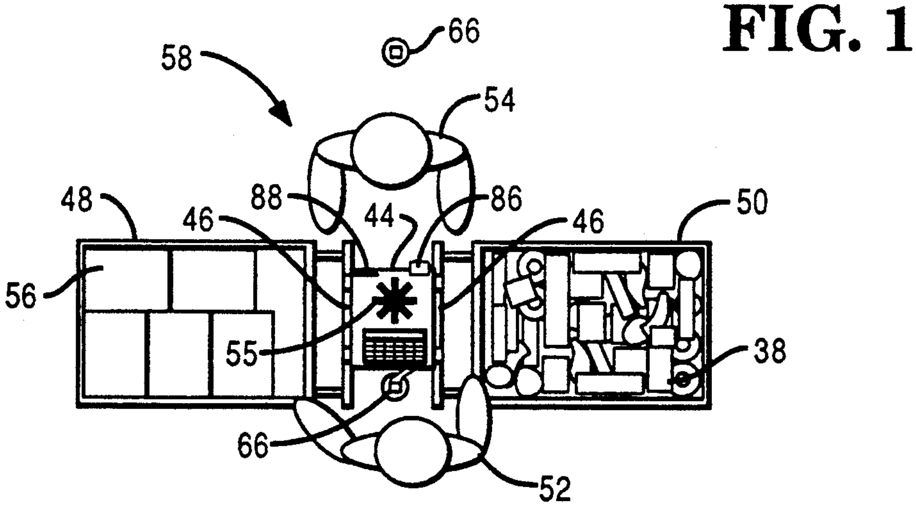
FIG. 1 PRIOR ART
FIG. 1 is a plan view of one embodiment of the checkout system constructed in accordance with the present invention.
Figure 1A:
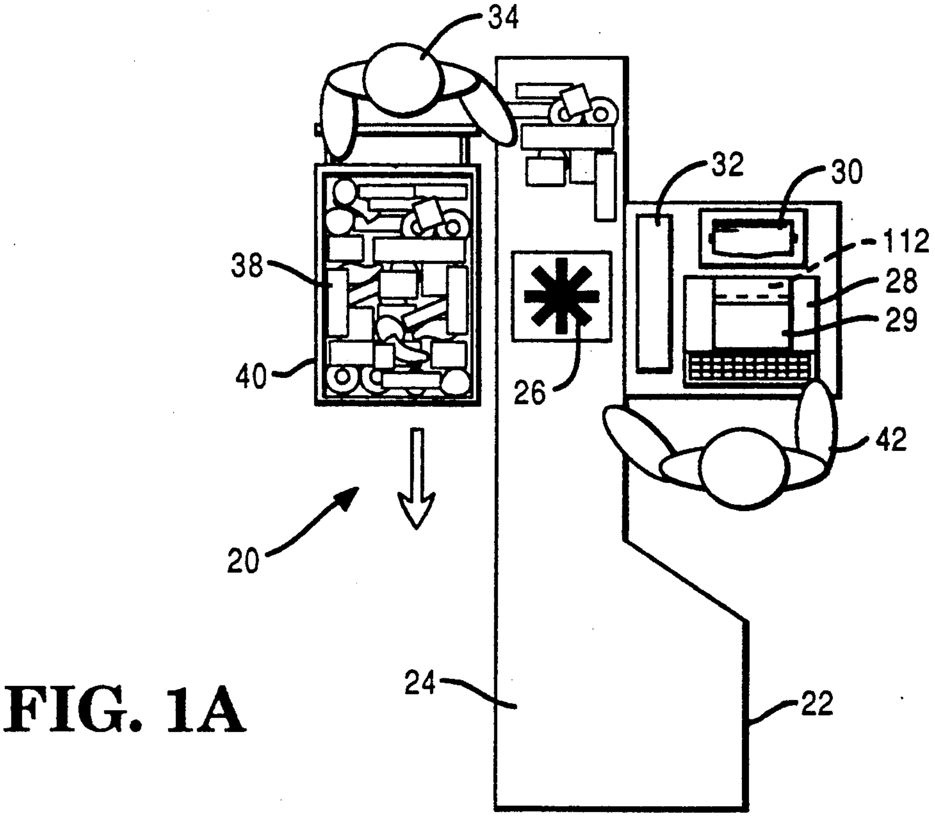
FIG. 1A is a plan view of a typical prior art checkout system.

Referring now to FIG. 1A, there is shown a plan view of a typical checkout system generally indicated by the numeral 20 which comprises a counter member 22 having a top supporting surface 24 on which is located a scanning window 26. The scanning window 26 is associated with an optical scanner located within the checkout counter 22. An example of an optical scanner that may be used in the present embodiment can be found in U.S. Pat. No. 4,797,551 which is assigned to the assignee of the present invention and which is incorporated by reference in the present application.

Associated with the checkout counter 22 is a data terminal device 28 which includes a display monitor 29, a scale member 30 and a display member 32. As is well known in the art, information generated by the reading of a bar code label mounted on a purchased merchandise item is displayed in the display 32 to indicate to the customer the price of the item purchased. If the purchased merchandise item pertains to produce, the merchandise item is positioned on the scale 30 from which the information is then transmitted to the data terminal 28 device where the information pertaining to the price of the item is then displayed on the display 32. Included in the terminal device 28 is a printer (not shown) which outputs a receipt member on which is printed the price of each merchandise item purchased by the customer together with the total price of the purchased merchandise items. In a normal checkout operation, a customer 34 will have placed his or her purchased merchandise items 38 within a grocery cart 40. The customer 34 would then position the cart adjacent the scanning window 26 during a checkout operation. Either the customer 34 or the operator 42 will remove the merchandise items 38 from the cart 40 with the operator moving the items past the scanning window 26 through which are projected scanning light beams for reading the coded label on the merchandise item. In most cases, the number of customers that can be processed in this type of checkout operation is limited such that the customers are obliged to wait in a line adjacent the counter during the checkout operation until they are able to move their grocery cart 40 adjacent the scanning window 26.

In one embodiment of the present invention, a checkout system generally indicated by the numeral 58 (FIGS. 1 and 2) includes a portable scanning terminal 44 which is mounted on the handles 46 of adjacent grocery carts 48 and 50 of a customer 52 who is waiting in line adjacent the checkout counter 22. The checkout operator 54 will mount the scanning unit 44 on the handles in such a manner as to allow the operator or the customer to check out the merchandise items located in the grocery cart 50 by passing the items individually across a scanning window 55 located in the scanning terminal 44. Each merchandise item that is scanned is deposited in one of the bags 56 positioned in the grocery cart 48. In a second embodiment, the scanning terminal 44 is mounted on a single grocery cart (FIG.3).

Figure 2:
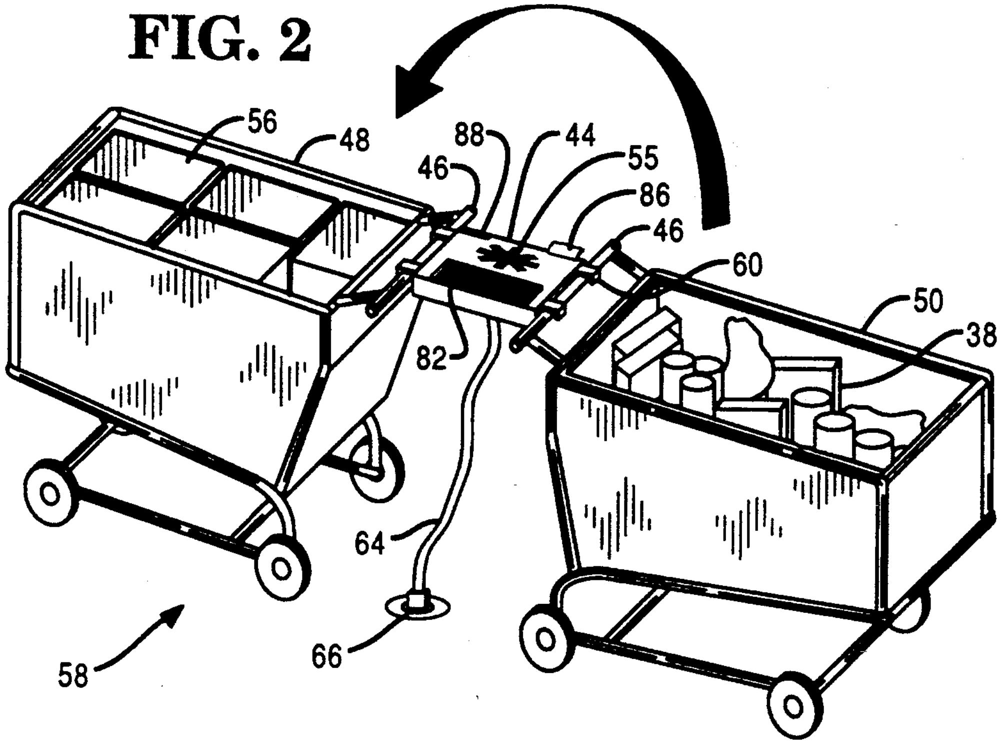
FIG. 2 is a perspective view of one embodiment of the checkout system of the present invention.

Referring now to FIG. 2, there is disclosed a perspective view of the checkout system indicated by the numeral 58 in FIG. 1. As shown, the scanning terminal 44 is removably mounted on the handles 46 of the carts 48 and 50 by use of bracket members 60. As best seen in FIG. 4, each of the bracket members 60 has a depending end portion 62 which fits over the handles 46 of the carts enabling the scanning terminal 44 to be positioned between the carts. In one embodiment, an electrical cable 64 (FIGS. 2 and 3) secured to the scanning terminal 44 enables the scanning terminal to receive electrical signals for operating the scanner terminal and for use in transmitting electrical signals to a data processing system which may include the data terminal device 28 (FIG. 1A). The cable 64 is inserted in an electrical outlet 66 (FIGS. 1, 2 and 3 inclusive) located conveniently in the floor adjacent the checkout counter 22. In order to speed up the checkout operation, a number of electrical outlets 66 (FIG.1) can be positioned adjacent the checkout counter to enable a number of checkout operations to occur simultaneously, utilizing the scanning terminal 44 in order to relieve the congestion normally found at checkout counters during rush hour periods. In each case, the checkout operator 42 will move the grocery cart 50 of a customer to a position adjacent the electrical outlet 66 in a position facing the grocery cart 48 which contains the bags 56. After mounting the scanning terminal 44 on the handles 46 of the adjacent grocery carts and inserting the electrical cable 64 into an electrical outlet 66, a checkout operation can commence which speeds up the checkout operation for the customers standing in line adjacent the checkout counter 22.

Figure 3:
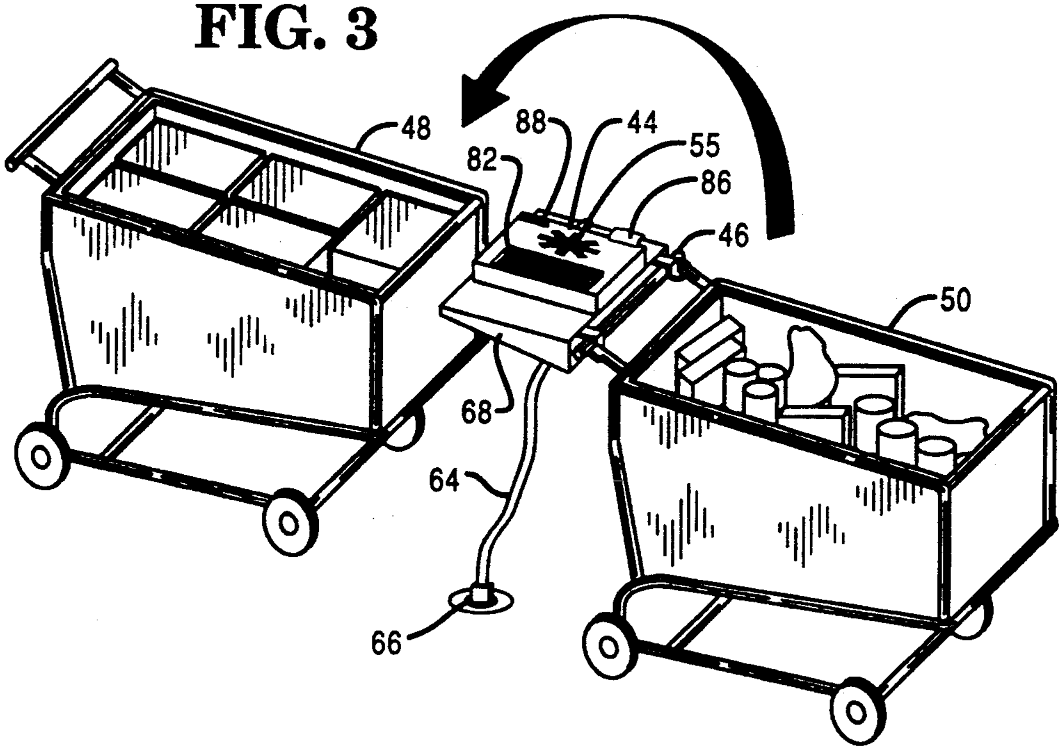
FIG. 3 is a perspective view of a second embodiment of the checkout system of the present invention.
Figure 4:
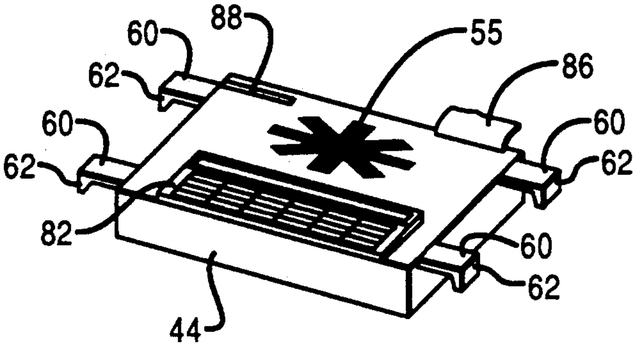
FIG. 4 is a perspective view of the scanning terminal constructed to be mounted between adjacent grocery carts.
Figure 5:
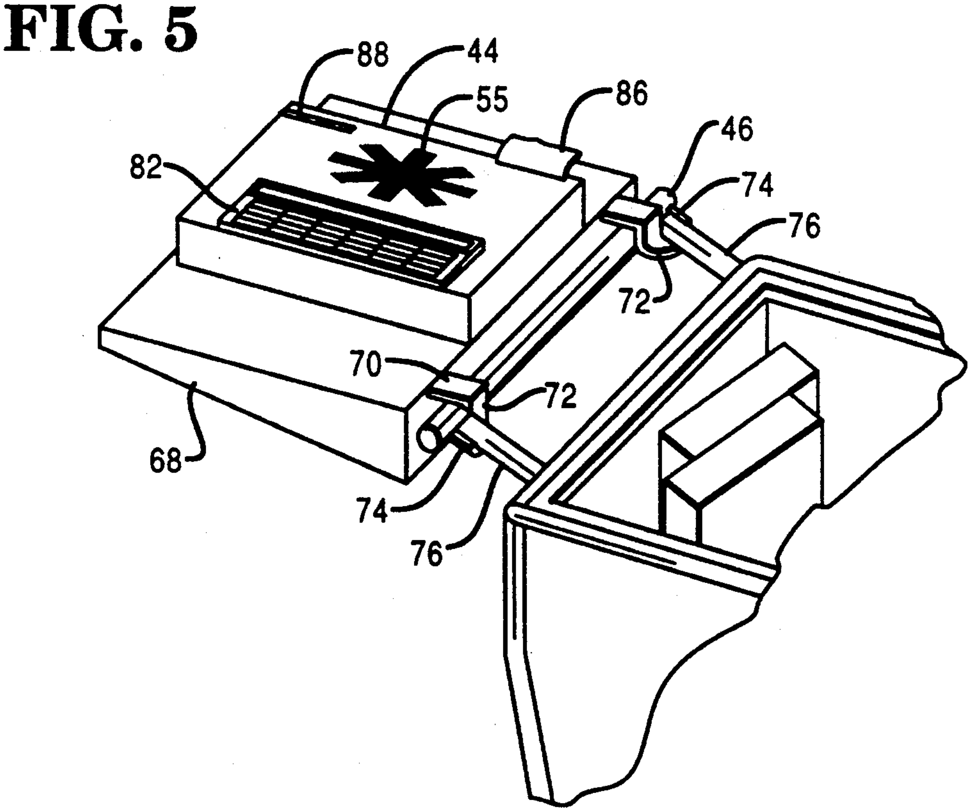
FIG. 5 is a perspective view of the scanning terminal mounted to the handle of a single grocery cart.

Referring now to FIGS. 3 and 5, there is shown a second embodiment of the present invention in which the scanning terminal 44 is positioned on a support member 68 mounted on the handle 46 of the cart 50. As best shown in FIG. 5, the support member 68 has a pair of bracket members 70 which extends outwardly in a horizontal direction. Each bracket member 70 includes a depending end portion 72 having a hook extension portion 74 which is twisted 90 degrees to engage the undersurface of a handle support member 76. This construction enables the support member 68 to be rigidly mounted to the handle 46 and the handle support member 76. As shown in FIG. 3, the cable 64 is secured to the scanning terminal 44 and is threaded through an opening (not shown) located in the support member 68 and inserted into the electrical outlet 66.

As will be described more fully hereinafter, the scanning terminal 44 (FIG. 5) may include a transceiver 80 (FIG.7) for transmitting and receiving electrical signals generated as part of a scanning operation by the scanning terminal 44. The scanning terminal 44 further includes a keyboard/display unit 82 and a printer 84 (FIG. 7) which issues a receipt 86 (FIGS. 1, 2–5 inclusive) on which is printed the price of each merchandise item that is sold, together with the total price of the items. Also included in the scanning terminal is a slot 88 (FIGS. 2–5 inclusive) which cooperates with a magnetic stripe reader 90 (FIG. 7) for generating data contained in a credit card (not shown) which is inserted in the slot 88 by the customer for use in paying for the purchased merchandise items.

Figure 6:
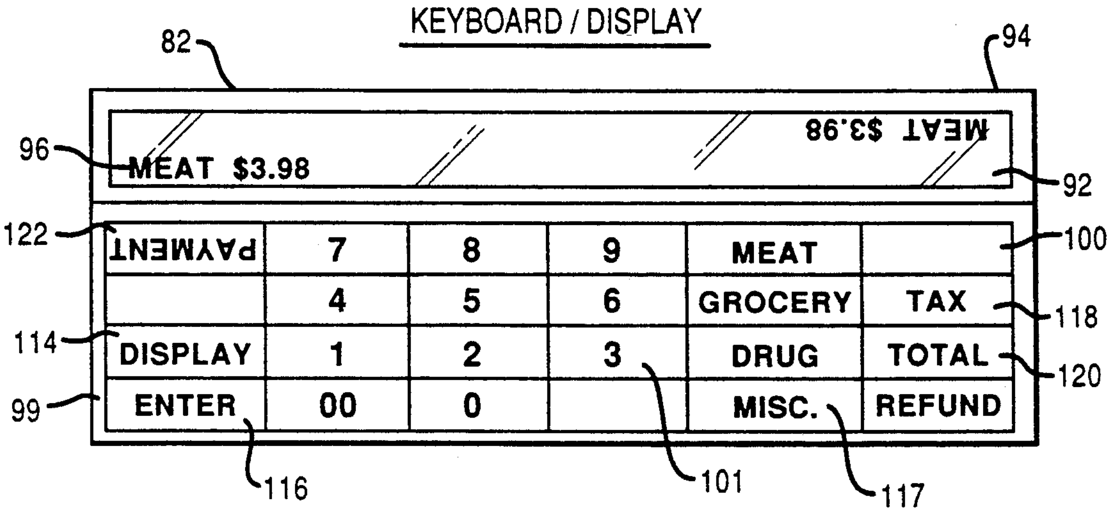
FIG. 6 is a plan view of the keyboard/display unit of the scanning terminal.

Referring now to FIG. 6, there is shown a plan view of the keyboard/display unit 82 which comprises a two-way display portion 92 for displaying customer data 94 and operator data 96 and a two-way keyboard portion 99 which displays keyboard indicia to both the customer and the operator. When a bar code label on the purchased merchandise item is scanned by the optical scanner 98 (FIG. 7) located in the scanning terminal 44, the price of the merchandise item, together with a description of the item, are displayed in the display portion 92 for the customer and for the operator. As will be described more fully hereinafter, the keyboard portion 99 has a plurality of key positions 100 in which each position may comprise a liquid crystal display operated to reverse the orientation of the key indicia to allow both the operator and the customer to operate the keyboard portion. The keyboard portion 99 includes numerical keys 101, control keys 114, 116 and the transaction keys 117 which are used by both the operator and the customer in processing the purchased merchandise item.

Figure 7:
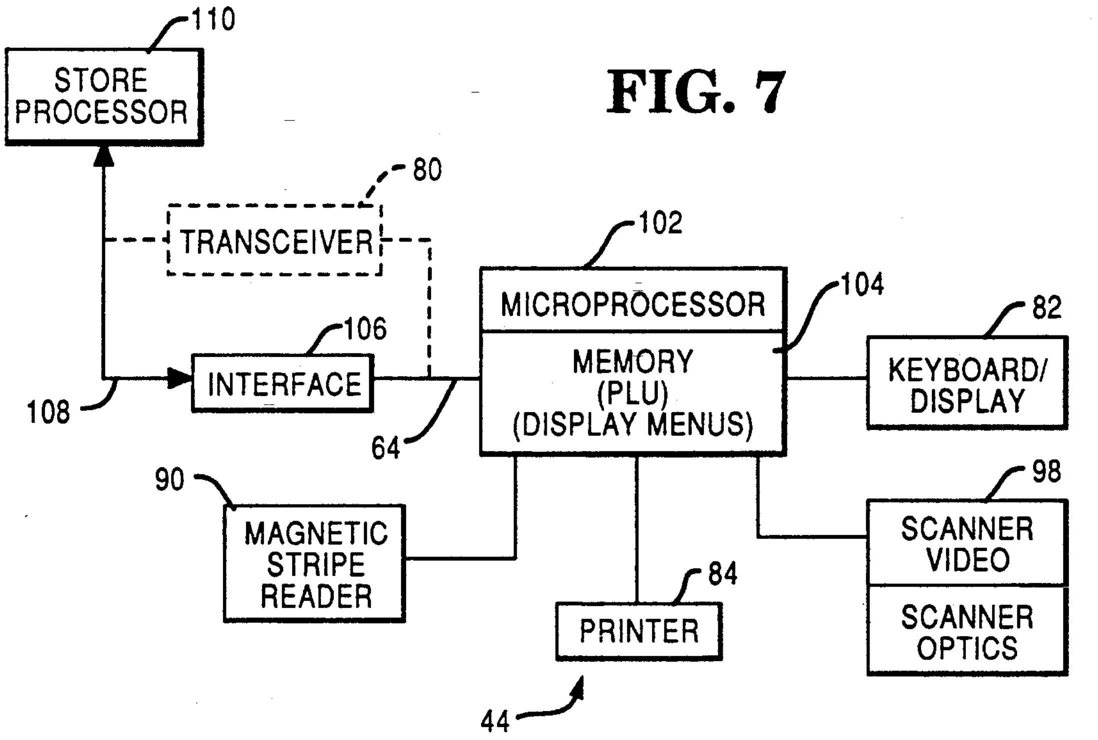
FIG. 7 is a block diagram of the processing system associated with the scanning terminal.

Referring now to FIG. 7, there is shown a block diagram of the data processing system associated with the scanning terminal 44. The terminal 44 includes a microprocessor 102 and a memory portion 104 which are used to control the operation of the keyboard/display unit 82, the optical scanner 98, the printer 84 and the magnetic stripe reader 90. In response to receiving data from the optical scanner 98, the microprocessor may obtain price lookup data from the memory portion 104 or may output the data over the cable 64 to an interface unit 106 which may be located in the data terminal device 28 (FIG. 1A) from where the data is then transmitted over a communication line 108 to a remotely located store processor 110. The processor utilizes the information to look up the price of the merchandise item being processed in a look-up table (not shown) in a manner that is well known in the art. The price of the item is then transmitted back over the communication line 108 through the interface 106 to the microprocessor 102 which will then control the keyboard/display unit 82 to display the information and operate the printer 84 for printing the information on the receipt 86. If the scanning terminal 44 includes the transceiver 80, the information outputted by the transceiver will be picked up by the interface unit 106 utilizing a transceiver 112 (FIG.1A) located within the data terminal device 28 which transmits the received data over the communication line 108 to the store processor 110. When the terminal 44 includes the transceiver 80, the terminal may include a battery (not shown) for operating the terminal thereby eliminating the need for the cable 64.

The operation of the present invention is initiated when the scanning terminal 44 is mounted between the carts 48, 50 in the manner described previously and a purchased merchandise item is moved across the scanning window 55 (FIGS. 1, 2–5 inclusive) in the scanning terminal 44. The optical scanner 98 (FIG. 7) includes the scanner optics system which scans the bar code label and generates electrical signals which are transmitted to the microprocessor 102 where a price look-up operation is performed as previously described. Next, the price information is then displayed to the customer in the display unit 82 and printed on the receipt 86 by the printer 84. If the bar code label cannot be decoded by the optical scanner 98, the operator will utilize the keys 101 on the keyboard portion 99 to manually enter the identification number into the system. To accomplish this, the operator depresses the DISPLAY key 114 (FIG. 6) which causes the display portion 92 of the display unit 82 to fold down a menu of options for the operator to use in processing the information. The operator enters the price of the item on the keyboard and upon hitting the ENTER key 116, the display portion 92 will display the price of the item and the printer 84 will be operated to print the price on the receipt 86. At the completion of the checkout operation, the operator will again operate the DISPLAY key 114 which enables the display portion 92 to again fold down a menu of options providing further instructions to the operator as to what keys are to be depressed to finalize the checkout operation. The operator will then depress the tax key 118 and the total key 120 at which time the total price of the purchased merchandise items is displayed in the display portion 92 and is oriented to allow the customer to observe the total price.

In response to the displaying of the total cost of the purchased merchandise items, the customer will depress the control key 122 which may be illuminated at this time and which causes the display portion 92 to fold down a menu showing the options that the customer may make for payment of the merchandise items. The actuation of key 122 also controls the liquid crystal displays of the keyboard portion 99 to reverse the orientation of the indicia in the key positions 100 (FIG.7) so that the indicia of the keys 101 face the customer. Upon making his choice through the keyboard portion 99, the customer can move his debit/credit card through the slot 88 and enter his PIN number using the keys 101 in the keyboard portion 99 to perform an off-line credit/debit transaction. The transaction is now complete with the printer having printed full item descriptions of the purchased merchandise items and the price together with the tax, the total of the purchased merchandise items and the method of payment. The printer will now cut off the receipt 86 (FIG.5) to enable the customer to remove the receipt from the scanning terminal.

It will be seen that the present invention enables a checkout operation to occur anywhere in the store where an electrical receptacle 66 is located. In one embodiment, the scanning terminal can be suspended from the handles of oppositely facing grocery carts enabling simultaneous customer/operator unload/scan and bagging operations to occur from one cart to a second cart. In another embodiment of the invention, the scanning terminal is mounted on a single grocery cart. A record of all the transactions that occur in connection with the scanning terminal can be stored in the terminal until it is uploaded to a personal computer system where the data can be more efficiently manipulated for item tracking purposes. Other provisions are made for enabling the data to be transmitted at the time the scanning terminal is operated.

While the principles of the invention have now been made clear in an illustrated embodiment, it will be obvious to those skilled in the art that many modifications of structure, arrangements, elements and components can be made which are particularly adapted for specific environments and operating requirements without departing from those principles. The appended claims are therefore intended to cover and embrace any such modifications, within the limits only of the true spirit and the scope of the invention.

What is claimed is:

1. In a merchandising establishment having a stationary checkout station in which each purchased merchandise item has located thereon a coded label identifying the item, a portable operator controlled checkout system which can be moved to any position within the establishment for processing purchased merchandise items comprising:

a portable optical scanning apparatus including a scanning window through which scanning light beams are projected and a plurality of bracket members extending outwardly in a horizontal plane in opposite directions from opposite sides of said scanning apparatus;

a first movable cart member containing purchased merchandise items and having a first handle member securely engaging one of said bracket members for horizontally positioning the scanning apparatus adjacent to said first handle member and in said horizontal plane with said first handle member of the cart member; and a second movable cart member for supporting processed purchased merchandise items having a second handle member engaging another of said bracket members on the opposite side of said scanning apparatus from said one of said bracket members for supporting the optical scanning apparatus horizontally in alignment with and between the first and second handle members of said movable cart members, enabling a checkout operator located adjacent the scanning apparatus and between the first and second movable cart members to move a purchased merchandise item located in the cart member past the scanning window along the scanning apparatus to read the coded label after which the merchandise item is positioned in said second cart member.

2. The checkout system of claim 1 in which the scanning apparatus is operator controlled and includes a display for simultaneously displaying the price of a purchased merchandise item to both the purchaser of the purchased merchandise item and the checkout operator positioned on opposite sides of the scanning apparatus.

3. A method for use in an establishment enabling a checkout operator to checkout at any location in the establishment a plurality of merchandise items purchased by a customer each having a coded label identifying the merchandise item, comprising the steps of:

removably mounting one end of a portable scanning device having a display portion securely to the handles of a first grocery cart containing purchased merchandise items in a horizontal plane adjacent to and in alignment with said handles of the grocery cart;

moving a second grocery cart which is empty to a position where the handles of the second grocery cart engage the other end of the secured portable scanning device in the same horizontal plane as that of but opposite to the engaged position of said first grocery cart;

moving a purchased merchandise item from the first grocery cart past the scanning device for scanning the coded label to generate the price of the merchandise item;

displaying the price of the merchandise item in the display portion of the scanning device simultaneously to the oppositely located operator and the customer; and depositing the scanned merchandise item in the second grocery cart.

* * * * *